(12) United States Patent
Zafiroglu et al.

(10) Patent No.: US 9,449,512 B2
(45) Date of Patent: Sep. 20, 2016

(54) ORCHESTRATING AUTONOMOUS MOVEMENTS OF PARKED VEHICLES TO OPTIMIZE PARKING EFFICIENCY

(71) Applicant: Intel Corporation, Santa Clara, CA (US)

(72) Inventors: Alexandra C. Zafiroglu, Portland, OR (US); Jennifer A. Healey, San Jose, CA (US); Juan I. Correa, San Francisco, CA (US); Maria Paula Saba dos Reis, New York, NY (US); Alejandro Abreu, Tempe, AZ (US); Victoria S. Fang, Mountain View, CA (US); Dalila Szostak, Portland, OR (US); Sarah E. Fox, Cartersville, GA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 14/226,244

(22) Filed: Mar. 26, 2014

(65) Prior Publication Data
US 2015/0279210 A1    Oct. 1, 2015

(51) Int. Cl.
*G08G 1/065*    (2006.01)
*G08G 1/16*    (2006.01)

(52) U.S. Cl.
CPC .............. *G08G 1/065* (2013.01); *G08G 1/168* (2013.01)

(58) Field of Classification Search
CPC ...... B60W 30/00; B60W 30/06; G01G 1/00; G01G 1/168
See application file for complete search history.

(56) References Cited

U.S. PATENT DOCUMENTS

2014/0350853 A1* 11/2014 Proux .................... G01C 21/34
701/533

* cited by examiner

*Primary Examiner* — Yonel Beaulieu
(74) *Attorney, Agent, or Firm* — Barnes & Thornburg LLP

(57) ABSTRACT

Technologies for optimized vehicle parking include a parking management computing device and a number of advanced vehicles, each having an in-vehicle computing system. The parking management computing device establishes a secure control channel with each of the in-vehicle computing systems. Each of the in-vehicle computing systems may send a parking request to park or access the vehicle to the parking management computing device. The parking management computing device queries a number of the advanced vehicles that are already parked for positional or sensor data and determines an optimized parking configuration based on the parking request. The parking management computing device transmits movement requests to the in-vehicle computing systems to implement the optimized parking configuration. Each in-vehicle computing system may perform the movement request by using an autonomous driving capability, by using a remote control capability, or by notifying an operator. Other embodiments are described and claimed.

25 Claims, 7 Drawing Sheets

ORCHESTRATING AUTONOMOUS MOVEMENTS OF PARKED VEHICLES TO OPTIMIZE PARKING EFFICIENCY

BACKGROUND

Parking vehicles in dense urban areas is challenging. Physical space for parking spots is limited, and the demand for parking typically exceeds available parking capacity. Finding available parking often requires an individual driver to search an urban area for available parking, contributing to traffic congestion and waste. Accordingly, parking in urban areas can be expensive and time-consuming. Additionally, parking lots tend to use physical space inefficiently. Only a small proportion of the surface area in a typical parking lot is covered by parking spots; the rest is dedicated to drive lanes and other maneuvering spaces. Some parking lots may be "hyperpacked." That is, vehicles may be parked more densely than in traditional parking lots, for example by parking vehicles in deep rows without access to drive lanes, stacking vehicles vertically, or otherwise arranging the vehicles. However, even hyperpacked lots require significant space to access the vehicles, and additionally require parking attendants to move vehicles as required.

Modern vehicles may include many types of advanced drive capabilities. Those capabilities allow the vehicle to perform movements without direct control of the operator. For example, some vehicles include some kind of parking assist, which allows the vehicle to control acceleration, brake, and steering inputs required to move the vehicle into a nearby parking spot. Some vehicles include smart cruise control or active collision warning and avoidance systems that may detect nearby obstructions and/or initiate evasive actions. Indeed, some vehicles include full self-driving capabilities. In addition to advanced drive capabilities, modern vehicles include increasing amounts of available computing resources as well as communication connectivity.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
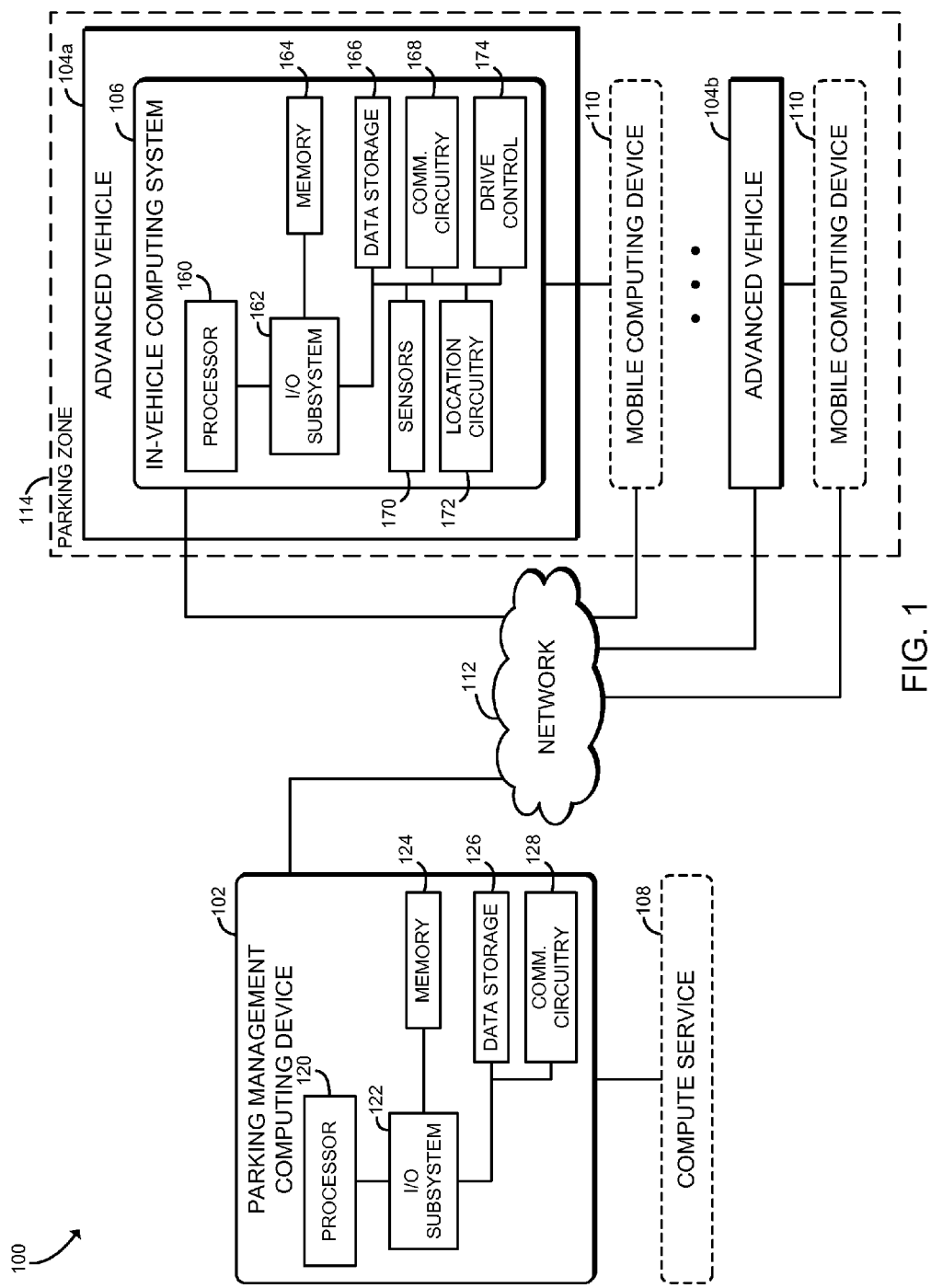
FIG. 1 is a simplified block diagram of at least one embodiment of a system for optimizing parking efficiency.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C): (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for optimizing parking efficiency includes a parking management computing device 102 and a number of advanced vehicles 104 physically positioned within or in close physical proximity to a parking zone 114. Each of the advanced vehicles 104 includes an in-vehicle computing system 106 that may control certain functions of the advanced vehicle 104, including autonomous drive capabilities in some embodiments. The various components of the system 100 may be in communication with each other over a network 112. In use, as discussed in more detail below, the parking management computing device 102 establishes a secure control connection with one or more in-vehicle computing systems 106 of advanced vehicles 104 located within or nearby the parking zone 114. Each in-vehicle computing system 106 may transmit a parking request to the parking management computing device 102. The parking request may include a request to park the advanced vehicle 104 or a request to access the advanced vehicle 104, for example to allow a user to retrieve the vehicle. The parking management computing device 102 determines an optimal parking configuration that services the request, and causes one or more of the advanced vehicles 104 to move to implement the optimal parking configuration. Each advanced vehicle 104 includes some kind of advanced drive control allowing the in-vehicle computing system 106 to cause the advanced vehicle 104 to move in response to a request from the parking management computing device 102. In some embodiments, the optimal parking configuration may be determined by a compute service 108 remote from the parking management computing device 102, for example a cloud computing service. In some embodiments, the parking request may originate from a mobile computing device 110 associated with the in-vehicle computing system 106, such as the driver's mobile phone.

Automatically determining optimal parking configuration and autonomously parking vehicles may improve parking efficiency. For example, in traditional parking lot configurations, the positions of parked advanced vehicles 104 may be adjusted to account for different vehicle sizes, to remove empty space, to account for vehicles leaving the parking lot, or to otherwise optimize parking lot usage. As another example, in hyperpacked parking lots or parking structures, efficiency may be increased by removing the requirement that a human operator be able to access each advanced vehicle 104; accordingly, costs associated with parking attendants may be reduced. Increasing parking efficiency may also improve parking capacity and/or reduce space requirements for parking, both of which may be particularly important for dense urban areas where physical space is expensive.

Referring back to FIG. 1, the parking management computing device 102 may be embodied as any type of computation or computer device capable of performing the functions described herein, including, without limitation, a computer, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, the parking management computing device 102 illustratively includes a processor 120, an input/output subsystem 122, a memory 124, a data storage device 126, and communication circuitry 128. Of course, the parking management computing device 102 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the parking management computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the parking management computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the parking management computing device 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication circuitry 128 of the parking management computing device 102 may be embodied as any communication circuit, device, or collection thereof, capable of enabling communications between the parking management computing device 102, the in-vehicle computing systems 106, and/or other remote devices over the network 112. The communication circuitry 128 may be configured to use any one or more communication technology (e.g., wired or wireless communications) and associated protocols (e.g., Ethernet, Bluetooth®, Wi-Fi®, WiMAX, etc.) to effect such communication.

Each advanced vehicle 104 is configured to autonomously or semi-autonomously move in response to movement requests from the parking management computing device 102. Each advanced vehicle 104 may be embodied as any type of car, truck, or other vehicle that includes an in-vehicle computing system 106 capable of performing the functions described herein. The in-vehicle computing system 106 is capable of operation even when the advanced vehicle 104 is an "off" or "parked" state (e.g., the engine is off, the ignition switch is in the off position, the transmission is in park, the parking brake is set, etc.) For example, the in-vehicle computing system 106 may use an independent power supply such as a battery backup and/or may be capable of operation in a low-powered connected standby, sleep, or soft-off state. Accordingly, the in-vehicle computing system 106 may be embodied as any type of computation or computer device capable of performing the functions described herein, including, without limitation, an in-vehicle infotainment device, an embedded computing device, a mobile computing device, a computer, a multiprocessor system, a laptop computer, a notebook computer, a network appliance, a web appliance, a distributed computing system, a processor-based system, and/or a consumer electronic device. Illustratively, the in-vehicle computing system 106 includes a processor 160, an I/O subsystem 162, a memory 164, a data storage device 166, communication circuitry 168, and/or other components and devices commonly found in a computer or similar computing device. Those individual components of the in-vehicle computing system 106 may be similar to the corresponding components of the parking management computing device 102, the description of which is applicable to the corresponding components of the in-vehicle computing system 106 and is not repeated herein so as not to obscure the present disclosure.

Each in-vehicle computing system 106 further includes a number of sensors 170, location circuitry 172, and a drive control subsystem 174. The sensors 170 may be embodied as any sensor or sensors capable of providing information about the position, nearby objects, or other attributes of the physical environment of the in-vehicle computing system 106. For example, the sensors 170 may include ultrasound, infrared, or laser rangefinders, visible- or infrared-light cameras, or three-dimensional LIDAR sensors. In some embodiments, the sensors 170 may include short-range communications sensors capable of communication or identification of other advanced vehicles 104, such as visible light communication sensors.

The location circuitry 172 of the in-vehicle computing system 106 may be embodied as any type of circuit capable of determining the precise or approximate position of the in-vehicle computing system 106 and, thus, the advanced vehicle 104. For example, the location circuitry 172 may be embodied as a global positioning system (GPS) receiver, capable of determining the precise coordinates of the in-vehicle computing system 106. In other embodiments, the location circuitry 172 may triangulate or trilaterate the position of the in-vehicle computing system 106 using distances or angles to cellular network towers with known positions, provided by the communication circuitry 168. In other embodiments, the location circuitry 172 may determine the approximate position of the in-vehicle computing system 106 based on association to wireless networks with known positions, using the communication circuitry 168.

The drive control subsystem 174 includes any control system capable of autonomously or semi-autonomously controlling movement of the advanced vehicle 104. In some embodiments, the drive control subsystem 174 may be embodied as a full autonomous driving subsystem. In such embodiments, the drive control subsystem 174 may be capable of controlling the movement of the advanced vehicle 104 from a starting position to a destination position. The destination position may be defined by geographical coordinates, address, or any other appropriate identification system. In those embodiments, the drive control subsystem 174 may fully control acceleration, steering, braking, collision avoidance, and other driving tasks of the advanced vehicle 104. Additionally or alternatively, in some embodiments the drive control subsystem 174 may be embodied as a driver assist system capable of limited control of movement of the advanced vehicle 104. For example, the drive control subsystem 174 may be embodied as a parking assist system capable of autonomously or semi-autonomously parallel parking the advanced vehicle 104. As another example, the drive control subsystem 174 may be embodied as an adaptive cruise control system, automated collision avoidance system, or other automated driver aid. In still other embodiments, the drive control subsystem 174 may be embodied as a remote control system allowing a remote computing device (such as the parking management computing device 102) to directly control movement of the advanced vehicle 104. The remote computing device, in turn, may include its own autonomous driving agent or may allow control by a human operator.

The compute service 108 may be embodied as any computing device, or collection of computing devices, capable of performing parking configuration optimization. As such, the compute service 108 may be embodied as a single server computing device or a collection of servers and associated devices. For example, in some embodiments, the compute service 108 may be embodied as a "virtual server" formed from multiple computing devices distributed across the network 112 and operating in a public or private cloud. Accordingly, although the compute service 108 is illustrated in FIG. 1 as embodied as a single server computing device, it should be appreciated that the compute service 108 may be embodied as multiple devices cooperating together to facilitate the functionality described below. As such, the compute service 108 may include components and features similar to the parking management computing device 102 and/or the in-vehicle computing system 106, such as a processor, I/O subsystem, memory, data storage, communication circuitry, and various peripheral devices, which are not illustrated in FIG. 1 for clarity of the present description.

Each of the mobile computing devices 110 may be embodied as any type of mobile computing device capable of performing the functions described herein including, without limitation, a smartphone, a cellular telephone, a handset, a wearable computing device, an in-vehicle infotainment device, a computer, a tablet computer, a laptop computer, a notebook computer, a messaging device, a network appliance, a web appliance, a distributed computing system, a multiprocessor system, a processor-based system, and/or a consumer electronic device. As such, each mobile computing device 110 may include components and features similar to the parking management computing device 102 and/or the in-vehicle computing system 106, such as a processor, I/O subsystem, memory, data storage, communication circuitry, and various peripheral devices, which are not illustrated in FIG. 1 for clarity of the present description.

As discussed in more detail below, the parking management computing device 102, the in-vehicle computing system 106, and other components of the system 100 may be configured to transmit and receive data with each other and/or other devices of the system 100 over the network 112. The network 112 may be embodied as any number of various wired and/or wireless networks. For example, the network 112 may be embodied as, or otherwise include, a wired or wireless local area network (LAN), a wired or wireless wide area network (WAN), a cellular network, and/or a publicly-accessible, global network such as the Internet. As such, the network 112 may include any number of additional devices, such as additional computers, routers, and switches, to facilitate communications among the devices of the system 100.

Figure 2:
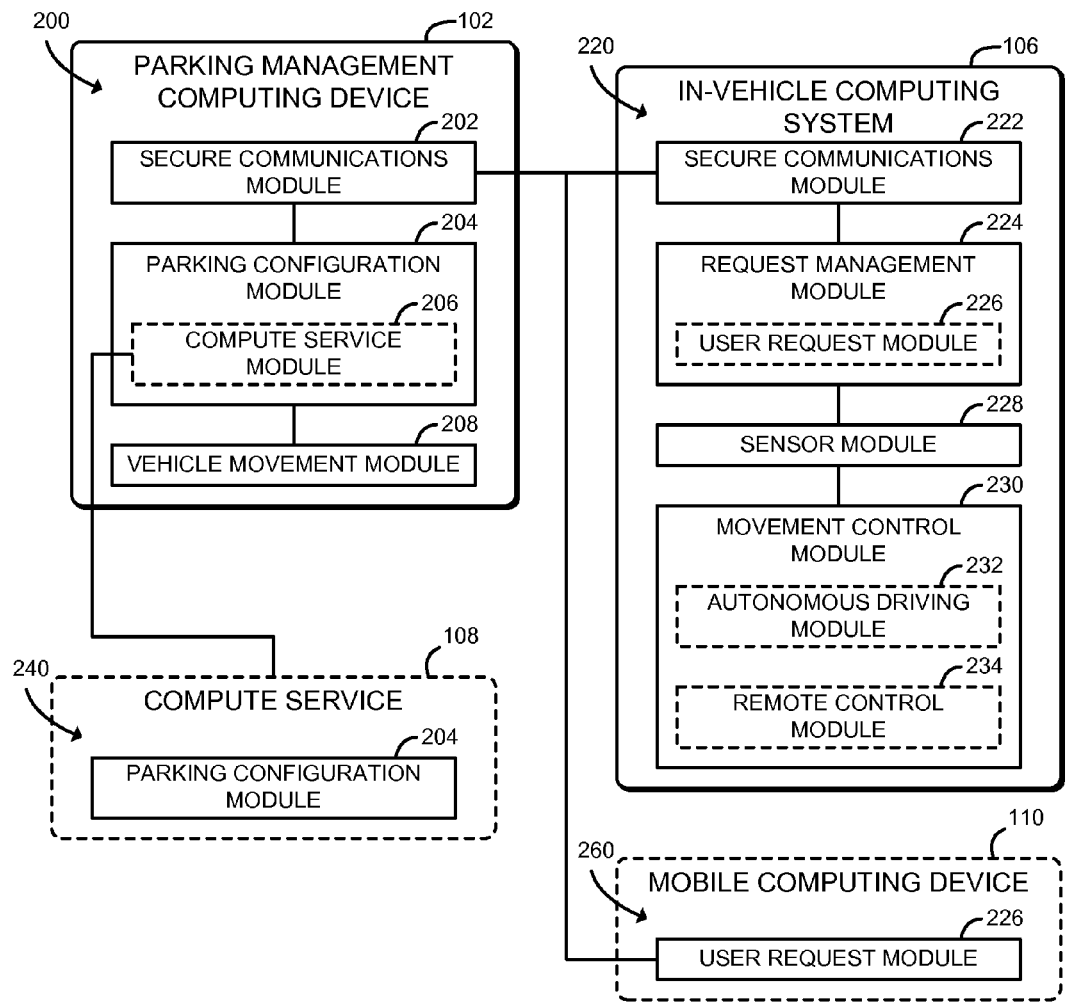
FIG. 2 is a simplified block diagram of at least one embodiment of various environments that may be established by the system of FIG. 1.

Referring now to FIG. 2, in an illustrative embodiment, the parking management computing device 102 establishes an environment 200 during operation. The illustrative environment 200 includes a secure communications module 202, a parking configuration module 204, and a vehicle movement module 208. The various modules of the environment 200 may be embodied as hardware, firmware, software, or a combination thereof.

The secure communications module 202 is configured to establish a secure control connection with the in-vehicle computing system 106 of each advanced vehicle 104 within or nearby the parking zone 114. The secure control connection may allow the parking management computing device 102 to authenticate itself to each in-vehicle computing system 106 and protect the control connection from eavesdropping and tampering. The secure control connection may be established once and kept open while each in-vehicle computing system 106 remains in the parking zone 114, or may be re-established as required for communication between the parking management computing device 102 and the in-vehicle computing system 106.

The parking configuration module 204 is configured to determine an optimal parking configuration for the advanced vehicles 104 within the parking zone 114. The optimal parking configuration may describe physical positions for the advanced vehicles 104 that have been optimized for space efficiency, access, or other parking aspects. For example, an optimal configuration may include hyperpacking the advanced vehicles 104 into less space than a typical parking pattern or may include adjusting the position of advanced vehicles 104 to reduce extra space between vehicles and reclaim unused space. The parking management computing device 102 may use any location placement optimization algorithm. In some embodiments, the parking configuration module 204 may offload some or all of the computations of the location placement optimization algorithm to the compute service 108. Those functions may be performed by a sub-module, for example by the compute service module 206.

The vehicle movement module 208 is configured to determine a number of vehicle movements required to implement the optimized parking configuration and to cause the in-vehicle computing systems 106 to implement the vehicle movements. The vehicle movement module 208 may transmit movement instructions in any format supported by the particular in-vehicle computing systems 106 of the advanced vehicles 104 to be moved. For example, the vehicle movement module 208 may transmit a destination for an autonomous driving subsystem of the in-vehicle computing system 106, or may remotely control the in-vehicle computing system 106.

Still referring to FIG. 2, in some embodiments, each in-vehicle computing system 106 may establish an environment 220 during operation. The illustrative environment 220 includes a secure communications module 222, a request management module 224, a sensor module 228, and a movement control module 230. The various modules of the environment 220 may be embodied as hardware, firmware, software, or a combination thereof.

The secure communications module 222 is configured to establish a secure control connection with the parking management computing device 102. The secure control connection may allow the in-vehicle computing system 106 to authenticate the parking management computing device 102 and protect the control connection from eavesdropping and tampering. The secure control connection may be established once and kept open while the in-vehicle computing system 106 remains in the parking zone 114, or may be re-established as required for communication between the parking management computing device 102 and the in-vehicle computing system 106.

The request management module 224 is configured to transmit parking requests to the parking management computing device 102 as required by the in-vehicle computing system 106. Parking requests may be send initially to request that the advanced vehicle 104 be parked within the parking zone 114. Parking requests may also be sent at a later time requesting that the advanced vehicle 104 be accessed. For example, a parking request to access the vehicle may be transmitted when the driver returns to the parking zone 114 and wishes to enter the advanced vehicle 104. Requests to access the advanced vehicle 104 may be used when the advanced vehicles 104 are hyperpacked within the parking zone 114 or when the advanced vehicle 104 is otherwise inconvenient to access. The parking request may be sent in response to a user request, for example a selection on an in-vehicle infotainment device or on a mobile computing device 110. Those functions may be performed by sub-modules, for example by a user request module 226.

The sensor module 228 is configured to generate sensor data describing the location of the advanced vehicle 104, the location of obstacles, and other attributes of the physical environment of the parking zone 114. The sensor module 228 may generate that sensor data using any combination of the sensors 170, the location circuitry 172, or in some embodiments the data received through the communication circuitry 168. The sensor module 228 may transmit the sensor data to the parking management computing device 102 and may provide the sensor data to the movement control module 230.

The movement control module 230 is configured to perform movement instructions received from the parking management computing device 102 using the drive control system 174 of the in-vehicle computing system 106. As described above, the movement control module 230 may support movement instructions in any format that may be performed by the drive control system 174. For example, in some embodiments the movement control module 230 may autonomously drive the advanced vehicle 104 to a destination provided by the parking management computing device 102. Additionally or alternatively, in some embodiments the movement control module 230 may enable remote control of the in-vehicle computing system 106 by the parking management computing device 102. Those functions may be performed by sub-modules, for example by an autonomous driving module 232 or by a remote control module 234.

Still referring to FIG. 2, in some embodiments an optional compute service 108 may establish an environment 240 during operation. The illustrative environment 240 includes the parking configuration module 204, which performs similar operations as described above in connection with the environment 200. The various modules of the environment 240 may be embodied as hardware, firmware, software, or a combination thereof. By locating the parking configuration module 204 in the compute service 108, performance and/or computational efficiency of the system 100 may be increased.

Still referring to FIG. 2, in some embodiments an optional mobile computing device 110 may establish an environment 260 during operation. The illustrative environment 260 includes the user request module 226, which performs similar operations as described above in connection with the environment 220. The various modules of the environment 260 may be embodied as hardware, firmware, software, or a combination thereof. By locating the user request module 226 in the mobile computing device 110, a user may be able to conveniently manage parking of the in-vehicle computing system 106 while physically remote from the in-vehicle computing system 106.

Figure 3:
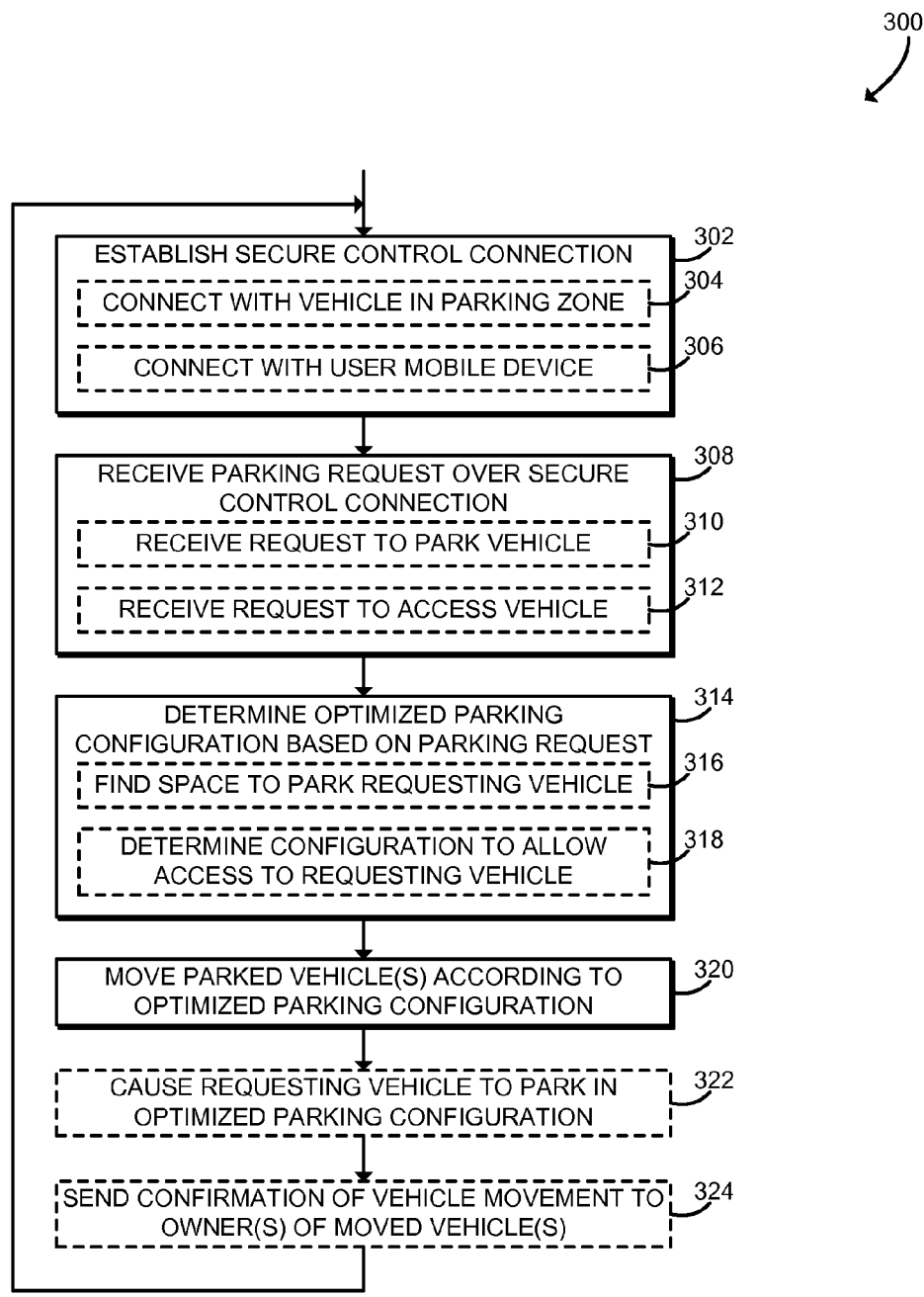
FIG. 3 is a simplified flow diagram of at least one embodiment of a method for optimizing parking efficiency that may be executed by a parking management computing device 102 of the system of FIGS. 1 and 2.

Referring now to FIG. 3, in use, the parking management computing device 102 may execute a method 300 for optimizing parking efficiency in the parking zone 114. The method 300 begins with block 302, in which the parking management computing device 102 establishes a secure control connection associated with an in-vehicle computing system 106 of an advanced vehicle 104. In some embodiments, the control connection may be a secure wireless connection over a wireless network installed in or otherwise localized to the parking zone 114. The control connection may be secured using any technique to protect the connection from eavesdropping and/or to verify the authenticity of the parking management computing device 102 and/or the in-vehicle computing system 106. In some embodiments, in block 304 the parking management computing device 102 may establish the secure control connection directly with the in-vehicle computing system 106. The in-vehicle computing system 106 may be positioned within the parking zone 114 or in close proximity to the parking zone 114 (e.g., near an entrance to the parking zone 114). In some embodiments, in block 306 the parking management computing device 102 may establish the secure control connection with a mobile computing device 110 associated with the in-vehicle computing system 106. In some embodiments, the mobile computing device 110 may be paired with, in communication with, or otherwise authenticated by the in-vehicle computing system 106. The mobile computing device 110 may or may not be within close physical proximity of the in-vehicle computing system 106 or the parking zone 114. For example, in some embodiments, the mobile computing device 110 may be a smartphone carried by a user and/or driver of the advanced vehicle 104 and thus may be carried away from the parking zone 114 by the user.

In block 308, the parking management computing device 102 receives a parking request associated with the advanced vehicle 104 over the secure control connection. In some embodiments, in block 310, the parking management computing device 102 may receive a request to park the advanced vehicle 104 in the parking zone 114. The request to park the vehicle may be initiated, for example, by the driver of the advanced vehicle 104 using an in-vehicle infotainment device or other in-vehicle control of the in-vehicle computing system 106. As an illustration, after arriving at the parking zone 114, the driver of the advanced vehicle 104 may make a selection on an in-vehicle control to request automated parking. Additionally or alternatively, the request to park the vehicle may be initiated by a mobile computing device 110 associated with the in-vehicle computing system 106. Still additionally or alternatively, the request to park the vehicle may be initiated automatically by the in-vehicle computing system 106 when the advanced vehicle 104 is in proximity to the parking zone 114. In some embodiments, in block 312 the parking management computing device 102 may receive a request to access advanced vehicle 104. Similar to the request to park the vehicle, the request to access the vehicle may be initiated by the in-vehicle computing system 106 in response to driver input or automatically, or may be initiated by a mobile computing device 110. For example, the driver of the advanced vehicle 104 may initiate a request to access the advanced vehicle 104 prior to returning to the parking zone 114, to allow time for the advanced vehicle 104 to be made accessible.

In block 314, the parking management computing device 102 determines an optimized parking configuration based on the parking request. In other words, the parking management computing device 102 determines a physical configuration of advanced vehicles 104 within the parking zone 114 that is optimized or approximately optimized in some way, e.g., for space efficiency, ease of access, or any other criteria. In some embodiments, in block 316, the parking management computing device 102 may create or identify physical space within the parking zone 114 to park an advanced vehicle 104. In some embodiments, in block 318, the parking management computing device 102 may determine a parking configuration to allow access to an advanced vehicle 104. For example, the parking management computing device 102 may move the advanced vehicle 104 to allow access to vehicle doors or to move the advanced vehicle 104 to a position within the parking zone 114 accessible by the driver (i.e. a loading zone). The parking management computing device 102 may perform any algorithm to optimize or approximately optimize the parking configuration. One such algorithm is described further below in connection with FIG. 5.

In block 320, the parking management computing device 102 moves one or more advanced vehicles 104 that have already been parked within the parking zone 114 according to the optimized parking configuration. For example, the parking management computing device 102 may adjust the position of parked advanced vehicles 104 to free up additional physical space for a new advanced vehicle 104 to park, or to make a previously parked advanced vehicle 104 accessible. To move the advanced vehicles 104, the parking management computing device 102 transmits one or more movement requests over the secure control connection previously established with each of the in-vehicle computing systems 106. One embodiment of a method for controlling movements of the advanced vehicles 104 is described further below in connection with FIG. 6.

In some embodiments, in block 322 the parking management computing device 102 may cause the advanced vehicle 104 having the in-vehicle computing system 106 that initiated the parking request to park in the optimized parking configuration. For example, in some embodiments, the parking management computing device 102 may cause the advanced vehicle 104 to park in a position previously identified in the optimized parking configuration. The parking management computing device 102 may transmit one or more movement requests to the requesting in-vehicle computing system 106 as described above in connection with block 320.

In some embodiments, in block 324 the parking management computing device 102 may send a confirmation of vehicle movement to the driver and/or owner of every advanced vehicle 104 that has been moved. The parking management computing device 102 may send a text message, email, or other notification to a mobile computing device 110 associated with the in-vehicle computing system 106. The confirmation of vehicle movement may include information describing the vehicle movement, including the final position of the advanced vehicle 104. Thus, the driver of the advanced vehicle 104 may be able to locate the advanced vehicle 104 in its new position upon returning to the parking zone 114. After sending any confirmations, the method 300 loops back to block 302 to continue establishing secure control connections. Although the method 300 has been illustrated as being executed sequentially, it should be understood that in some embodiments the functions of the method 300 may be executed in parallel, concurrently, contemporaneously, or in any other order. For example, the parking management computing device 102 may move several advanced vehicles 104 contemporaneously, receive sensor data from several advanced vehicles 104 contemporaneously, or service parking requests from several advanced vehicles 104 contemporaneously.

Figure 4A:
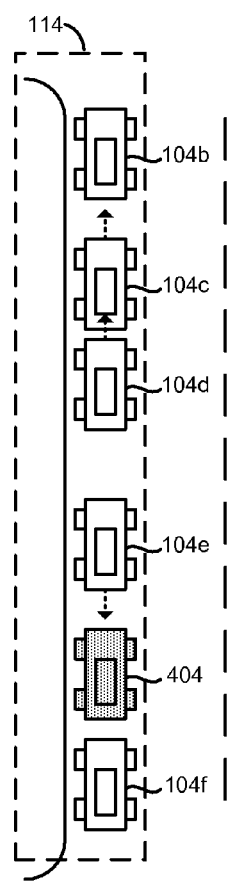
FIGS. 4A and 4B are schematic diagrams illustrating an example parking zone and optimized parking configuration.
Figure 4B:
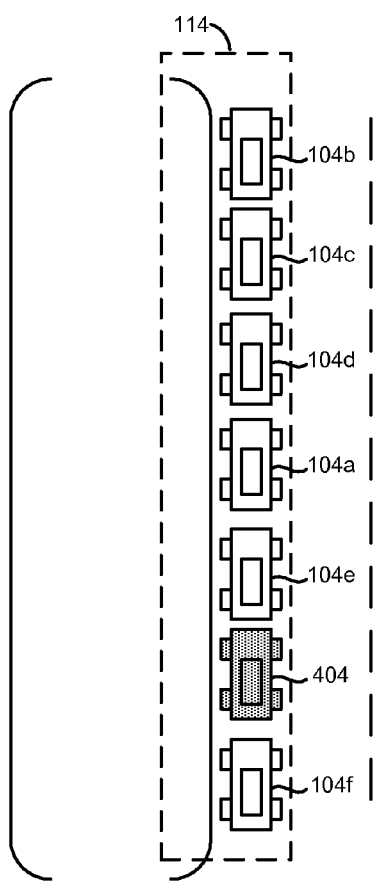

Referring now to FIGS. 4A and 4B, schematic diagrams 400 and 402 illustrate one example usage scenario of the system 100. In the illustrative example, the parking zone 114 is embodied as on-street parking for one city block. The parking management computing device 102 is capable of secure wireless communication with advanced vehicles 104 having in-vehicle computing systems 106 positioned within the parking zone 114 and nearby the parking zone 114. The diagram 402 illustrates initial conditions of the parking zone 114. Advanced vehicle 104*a* has recently arrived nearby the parking zone 114 and has sent a parking request to the parking management computing device 102. Advanced vehicles 104b through 104f are already parked in the parking zone 114. The parking zone 114 also includes the vehicle 404, which is a vehicle without advanced autonomous driving capabilities or otherwise not under the control of the parking management computing device 102. As shown, upon arrival, the parking zone 114 does not include a parking space large enough to accommodate the requesting advanced vehicle 104a. However, as illustrated by the dashed arrows, moving the advanced vehicles 104c, 104d, 104e would create a space large enough to accommodate the advanced vehicle 104a.

The diagram 402 illustrates the parking zone 114 after some of the advanced vehicles 104 have been moved to an optimal parking configuration. In the illustrative example, the advanced vehicles 104c, 104d were moved forward and the advanced vehicle 104e was moved backward to open a parking space large enough for the advanced vehicle 104a. After opening the parking space, the advanced vehicle 104a was parked in the newly freed parking space.

Figure 5:
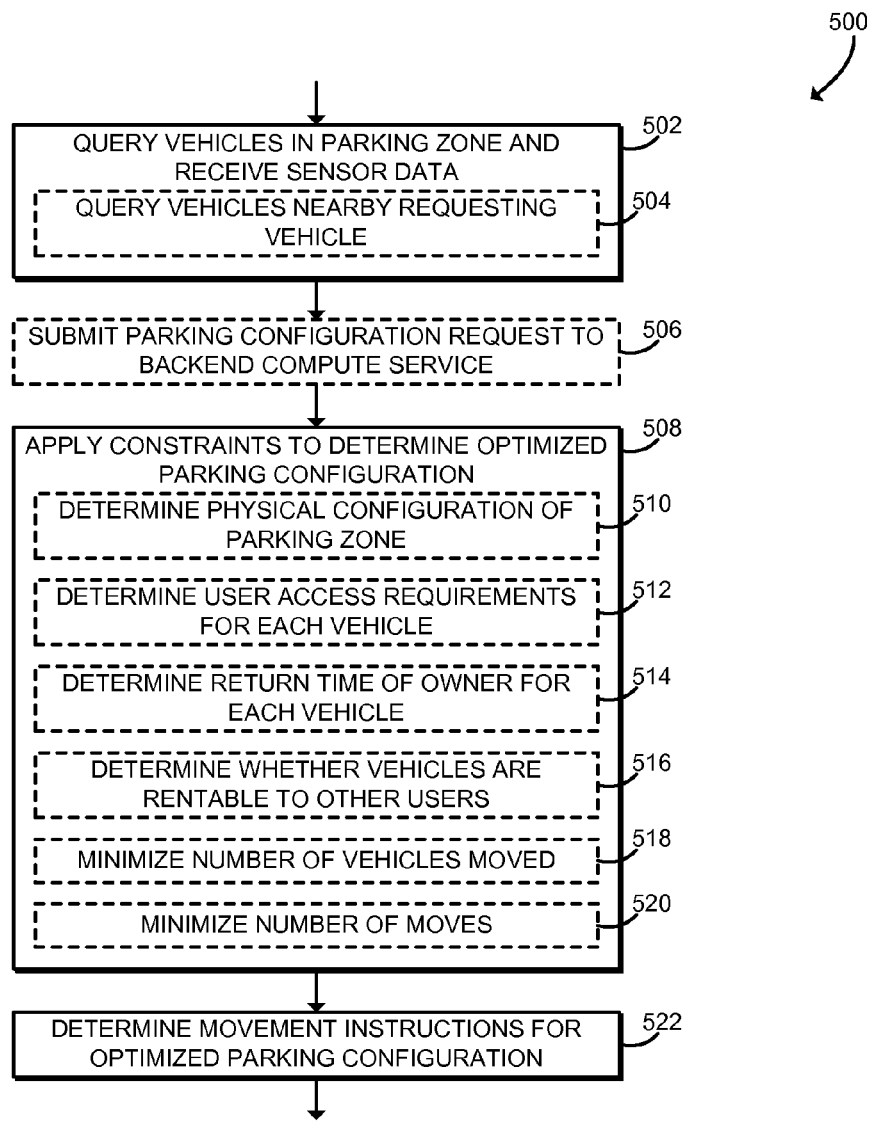
FIG. 5 is a simplified flow diagram of at least one embodiment of a method for determining an optimized parking configuration that may be executed by the parking management computing device 102 of the system of FIGS. 1 and 2.

Referring now to FIG. 5, in use, the parking management computing device 102 may execute a method 500 for determining an optimal parking configuration for the parking zone 114. The method 500 may be employed to free up or otherwise identify physical space within the parking zone 114 to park an advanced vehicle 104, or to make an advanced vehicle 104 accessible as described above in connection with block 314 of FIG. 3. The method 500 begins in block 502, in which the parking management computing device 102 queries the in-vehicle computing systems 106 of the advanced vehicles 104 within the parking zone 114 and receives sensor data from the in-vehicle computing systems 106. The sensor data provides information on the relative position of each advanced vehicle 104, obstructions within the parking zone 114, or other information on the physical environment of the parking zone 114. The sensor data may include proximity sensor data, camera data, remote sensing data such as lidar or radar, as well as location data such as GPS coordinates associated with each of the advanced vehicles 104. In some embodiments, in block 504 the parking management computing device 102 may query in-vehicle computing systems 106 of advanced vehicles 104 nearby an in-vehicle computing system 106 that has initiated a parking request. Thus, the parking management computing device 102 may limit the request to a subset of the in-vehicle computing systems 106 within the parking zone 114.

In some embodiments, in block 506 the parking management computing device 102 may submit a parking configuration request to a backend compute service 108. The compute service 108 may be a remote server, cloud computing provider, virtualized hosting platform, or other system to allow remote processing of some or all of the parking optimization algorithm. Offloading computation to the compute service 108 may allow the parking management computing device 102 to be embodied as a relatively low-powered or lightweight computing device located near the parking zone 114.

In block 508, the parking management computing device 102—and additionally or alternatively in some embodiments, the compute service 108—applies one or more constraints to determine an optimized or approximately optimized parking configuration. The parking management computing device 102 may apply any constraints applicable to optimize or approximately optimize parking within the parking zone 114. In some embodiments, in block 510 the parking management computing device 102 may determine the physical configuration of the parking zone 114, including the number, position, and available capacity of parking rows and other parking spaces. In some embodiments, in block 512, the parking management computing device 102 may determine user access requirements for each advanced vehicle 104. For example, in some embodiments one or more doors of each advanced vehicle 104 must remain accessible, i.e., with enough free space to allow a person to enter the door. As another example, in some embodiments, one or more of the advanced vehicles 104 may require user access, while other advanced vehicles 104 may allow parking with no user access, i.e., extremely compact parking without space to open doors. User access requirements may be based on a user preference at the time of parking, vehicle or parking zone policy, or on any other criteria. Similarly, in some embodiments in block 514 the parking management computing device 102 may determine a return time of the owner of each advanced vehicle 104. For example, advanced vehicles 104 with an owner return time relatively soon in the future may be parked in a position that is more readily available, while those advanced vehicles 104 with an owner return time relatively distant in the future may be parked in a less-accessible although more compact or efficient position. Owner return time may be supplied by a user at the time of parking, for example through an in-vehicle infotainment device, or may be supplied after the advanced vehicle 104 has been parked, for example using a mobile computing device 110.

In some embodiments, in block 516 the parking management computing device 102 determines whether any of the advanced vehicles 104 have been designated as being rentable to other users. For example, in some embodiments the advanced vehicles 104 may enable a short-term rental service, sometimes known as a "car-sharing" service. In such a rental service, after the advanced vehicle 104 has been parked by its owner, new users may rent the advanced vehicle 104 while the owner is not using the advanced vehicle 104. When an advanced vehicle 104 has been designated as rentable to other users, the parking management computing device 102 may ensure that the advanced vehicle 104 remains accessible to new users, for example by parking the advanced vehicle 104 in a designated section of the parking zone 114, ensuring that one or more doors of the advanced vehicle 104 remain accessible, or otherwise maintaining the accessibility of the advanced vehicle 104. The owner of the advanced vehicle 104 may indicate that the advanced vehicle 104 is rentable to the parking management computing device 102 at the time of parking, for example using an in-vehicle infotainment device or a mobile computing device 110.

In some embodiments, in block 518 the parking management computing device 102 may optimize the parking configuration to minimize the total number of advanced vehicles 104 moved to implement the parking configuration. Similarly, in some embodiments in block 520 the parking management computing device 102 may minimize the total number of moves required to implement the parking configuration. Minimizing the numbers of advanced vehicles 104 moved and/or the total number of moves may improve response time of the system 100, reduce complexity of the parking configuration, or otherwise improve operation of the system 100.

In block 522, after determining the optimized parking configuration, the parking management computing device 102 and/or the compute service 108 determines a number of movement instructions for the in-vehicle computing systems 106 to implement the optimized parking configuration. The movement instructions may be embodied as a set of discrete movements for the in-vehicle computing systems 106 to cause the advanced vehicles 104 to arrive at the parking configuration. The movement instructions may be directed at any combination of advanced vehicles 104 that have already been parked as well as those advanced vehicles 104 that have not yet been parked. The parking management computing device 102 may instruct the in-vehicle computing systems 106 to implement the movement instructions as described further below in connection with the method of FIG. 6. After determining the movement instructions, the method 500 is completed. The method 500 may be executed again in response to any additional parking requests received from the in-vehicle computing systems 106.

Figure 6:
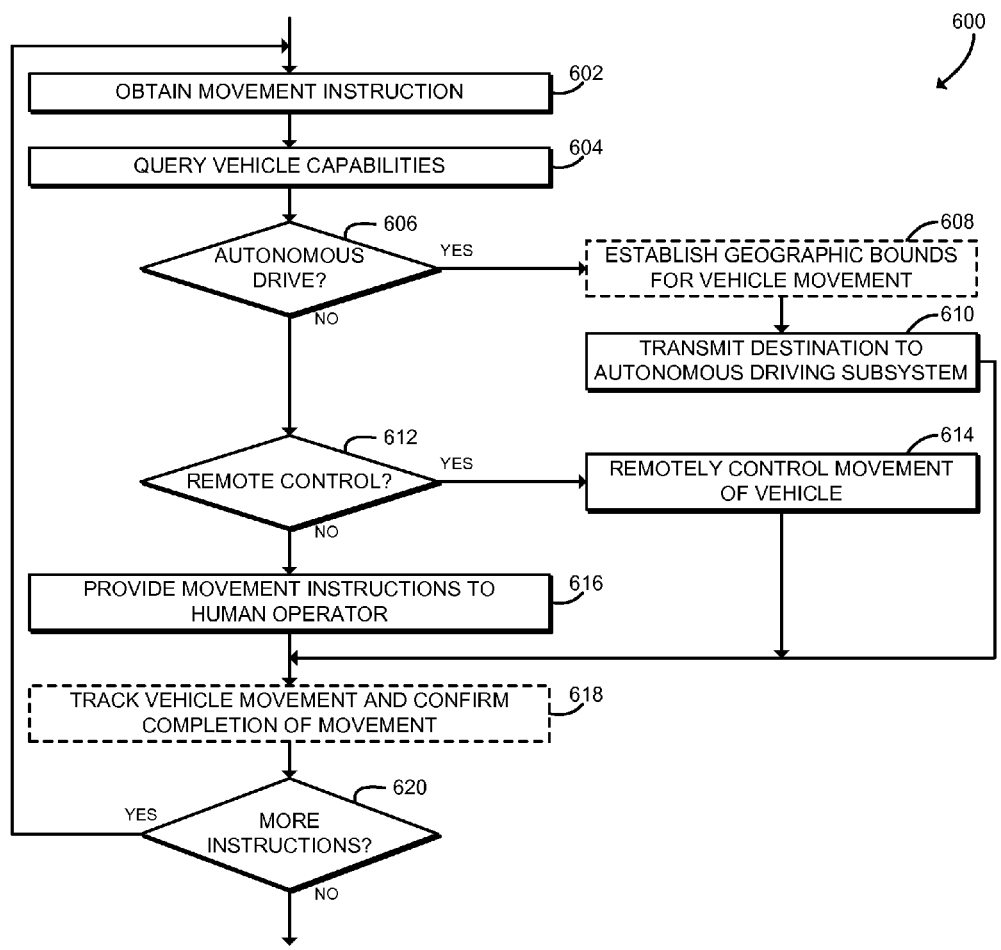
FIG. 6 is a simplified flow diagram of at least one embodiment of a method for moving vehicles to implement an optimized parking configuration that may be executed by the parking management computing device 102 of the system of FIGS. 1 and 2.

Referring now to FIG. 6, in use, the parking management computing device 102 may execute a method 600 for controlling one or more in-vehicle computing systems 106 within the parking zone 114. The method 600 may be executed to cause the in-vehicle computing systems 106 to implement an optimized parking configuration, as described above in connection with blocks 320, 322 of FIG. 3. The method 600 begins in block 602, in which the parking management computing device 102 obtains a movement instruction associated with an advanced vehicle 104. The movement instruction may be one of a number of movement instructions used to implement an optimized parking configuration, as described above in connection with the method of FIG. 5.

In block 604, the parking management computing device 102 queries the in-vehicle computing system 106 of the advanced vehicle 104 to be moved for information on the capabilities of the drive control subsystem 174 of the in-vehicle computing system 106. The in-vehicle computing system 106 replies with a response indicating available capabilities. For example, the in-vehicle computing system 106 may be capable of directing some degree of autonomous movement of the advanced vehicle 104. In some embodiments, the in-vehicle computing system 106 may be capable of fully autonomous driving. Additionally or alternatively, in some embodiments the in-vehicle computing system 106 may be capable of limited autonomous movements. For example, an advanced vehicle 104 with a parking assist system may be capable of moving slowly forward or backward and avoiding contact with obstructions. In other embodiments, the in-vehicle computing system 106 may be capable of remote control operation by the parking management computing device 102. In still other embodiments, the in-vehicle computing system 106 may not be capable of any autonomous or semi-autonomous movement.

In block 606, the parking management computing device 102 determines whether the in-vehicle computing system 106 is capable of autonomous drive. If not capable, the method 600 branches ahead to block 612, described below. If capable of autonomous drive, the method 600 advances to block 608.

In block 608, in some embodiments the parking management computing device 102 may establish permissible geographic bounds for movement of the advanced vehicle 104. The advanced vehicle 104 may not be moved outside of the permissible geographic bounds, which may be an important safety or security feature. For example, the permissible bounds may coincide with the boundary of the parking zone 114. The permissible geographic bounds may be described as geographical coordinates, described relative to the position of the advanced vehicle 104 or otherwise defined. The permissible geographic bounds may be enforced by the parking management computing device 102 or by being transmitted or otherwise provided to the in-vehicle computing system 106 of the advanced vehicle 104.

In block 610, the parking management computing device 102 transmits a destination to the autonomous drive control subsystem 174 of the in-vehicle computing system 106. The parking management computing device 102 may transmit the destination in any format useable by the in-vehicle computing system 106. For example, the parking management computing device 102 may transmit geographical coordinates of the destination to the in-vehicle computing system 106. Additionally or alternatively, the parking management computing device 102 may transmit relative location information associated with the destination to the in-vehicle computing system 106. For example, the parking management computing device 102 may transmit instructions for the in-vehicle computing system 106 to drive forward a certain distance, to turn a certain angle, or to perform any other autonomous movement. After transmitting the destination, the method 600 advances to block 618, described below.

Referring back to block 606, if the in-vehicle computing system 106 does not have autonomous drive capability, the method 600 branches ahead to block 612. In block 612, the parking management computing device 102 determines whether the in-vehicle computing system 106 has remote control capability. If not, the method 600 branches ahead to block 616, described below. If the in-vehicle computing system 106 has remote control capability, the method 600 advances to block 614.

In block 614, the parking management computing device 102 remotely controls movement of the advanced vehicle 104 via the in-vehicle computing system 106. In other words, the parking management computing device 102 directly controls movement of the advanced vehicle 104 using the in-vehicle computing system 106, without use or intervention of any autonomous driving subsystem or driver assist features of the in-vehicle computing system 106. The parking management computing device 102 may remotely control the in-vehicle computing system 106 based on sensor data provided by the sensors 170 and/or the location circuitry 172, including remote imaging data, proximity data, and/or location data. In some embodiments, the parking management computing device 102 may autonomously control movement of the advanced vehicle 104. In other words, rather than having its own autonomous driving capability, the in-vehicle computing system 106 may be controlled by an autonomous driving system embodied in the parking management computing device 102. Additionally or alternatively, in some embodiments the in-vehicle computing system 106 may be remotely controlled by a human operator of the parking management computing device 102. In such embodiments, the human operator may be thought of as a remote valet in control of one or more parking zones 114 through the parking management computing device 102. After remotely controlling movement of the advanced vehicle 104, the method 600 advances to block 618, described below.

Referring back to block 612, if the in-vehicle computing system 106 does not have remote control capability, the method 600 branches ahead to block 616. In block 616, the parking management computing device 102 provides the movement instruction to a human operator of the advanced vehicle 104. For example, the parking management computing device 102 may transmit human-readable instructions identifying a parking space to an in-vehicle infotainment device of the in-vehicle computing system 106 or to a mobile computing device 110 associated with the in-vehicle computing system 106. Human-operated instructions may be used as a fallback when autonomous or remote driving capabilities are not available. Thus, in some embodiments, less-capable vehicles may be integrated into the parking zone 114.

After providing the movement instruction to the in-vehicle computing system 106, in some embodiments in block 618 the parking management computing device 102 tracks movement of the advanced vehicle 104 and confirms completion of the movement instruction. In some embodiments, the parking management computing device 102 may track movement of the advanced vehicle 104 by monitoring sensor data provided by the in-vehicle computing system 106 over the secure control connection. Additionally, or alternatively, in some embodiments the parking management computing device 102 may track movement of the advanced vehicle 104 without relying on communications from the in-vehicle computing system 106, for example by monitoring sensors positioned within the parking zone 114. In those embodiments, the in-vehicle computing systems 106 may autonomously implement the movement instructions without further control or communication from the parking management computing device 102.

In block 620, the parking management computing device 102 determines whether additional movement instructions are required to implement the optimized parking configuration. If so, the method 600 loops back to block 602 to continue controlling the advanced vehicles 104. If no additional movement instructions remain, the method 600 is completed. As described above in connection with FIG. 3, after completion of required movement instructions, the parking management computing device 102 may monitor for additional parking requests from the in-vehicle computing systems 106.

Figure 7:
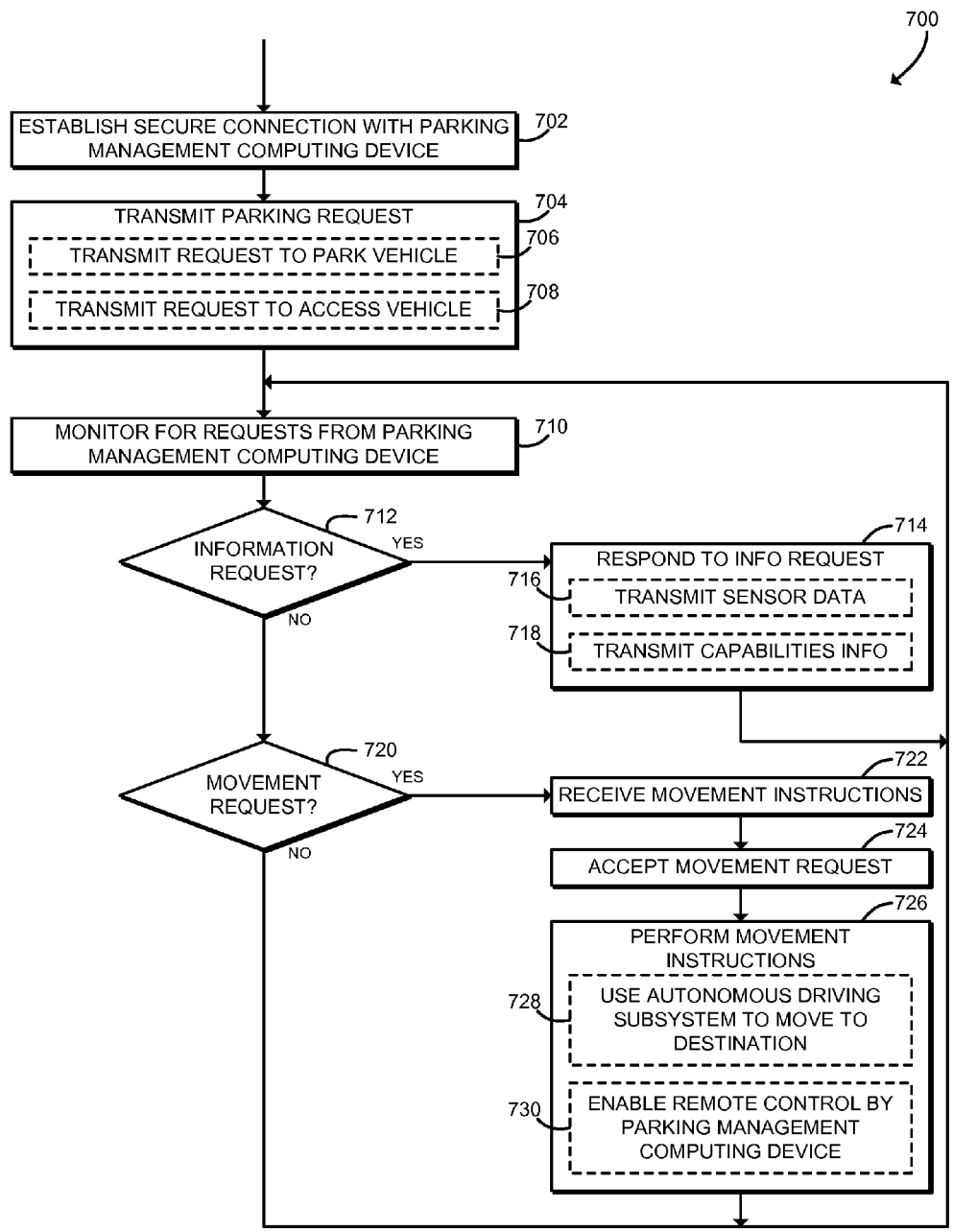
FIG. 7 is a simplified flow diagram of at least one embodiment of a method for optimizing parking efficiency that may be executed by an advanced vehicle of the system of FIGS. 1 and 2.

Referring now to FIG. 7, in use, an in-vehicle computing system 106 may execute a method 700 for optimizing parking efficiency in the parking zone 114. It should be understood that one or more in-vehicle computing systems 106 may execute the method 700 concurrently or contemporaneously, allowing numerous advanced vehicles 104 to be controlled within the parking zone 114. The method 700 begins in block 702, in which the in-vehicle computing system 106 establishes a secure connection with the parking management computing device 102. As described above, in some embodiments, the control connection may be a secure wireless connection over a wireless network installed in or otherwise localized to the parking zone 114. The control connection may be secured using any technique to protect the connection from eavesdropping and/or to verify the authenticity of the parking management computing device 102 and/or the in-vehicle computing system 106. The control connection may be established in response to a user command received from an in-vehicle infotainment device of the in-vehicle computing system 106 or from a mobile computing device 110.

In block 704, the in-vehicle computing system 106 transmits a parking request to the parking management computing device 102 via the secure control connection. In some embodiments, in block 706 the in-vehicle computing system 106 may transmit a request to park the advanced vehicle 104 in the parking zone 114. The request to park the vehicle may be initiated, for example, by the driver of the advanced vehicle 104 using an in-vehicle infotainment device or other in-vehicle control. As an illustration, after arriving at the parking zone 114, the driver of the advanced vehicle 104 may make a selection on an in-vehicle control to request automated parking. Additionally or alternatively, the request to park the vehicle may be initiated automatically by the in-vehicle computing system 106 when the advanced vehicle 104 is in proximity to the parking zone 114. In some embodiments, in block 708 the in-vehicle computing system 106 may transmit a request to access the advanced vehicle 104. Similar to the request to park the vehicle, the request to access the vehicle may be initiated by the in-vehicle computing system 106 in response to driver input, or in response to a request from a mobile computing device 110. For example, the driver of the advanced vehicle 104 may initiate a request to access the advanced vehicle 104 with a paired mobile computing device 110 prior to returning to the parking zone 114, to allow time for the advanced vehicle 104 to be made accessible.

After transmitting the parking request, in block 710 the in-vehicle computing system 106 monitors the secure control connection for a request from the parking management computing device 102. The in-vehicle computing system 106 may use any technique to monitor for requests, including maintaining an open connection with the parking management computing device 102, listening for connection requests from the parking management computing device 102, polling the parking management computing device 102 for new requests, or otherwise monitoring. The in-vehicle computing system 106 may monitor the secure control connection while in a "soft-off" state. That is, the in-vehicle computing system 106 may monitor the secure control connection while the advanced vehicle 104 is in an "off" or "parked" state (e.g., the engine is off, the ignition switch is in the off position, the transmission is in park, the parking brake is set, etc.). The processor 160, communication circuitry 168, or other computing resources of the in-vehicle computing system 106 may be periodically or continually activated or otherwise energized to monitor the secure control connection.

In block 712, the in-vehicle computing system 106 determines whether an information request has been received from the parking management computing device 102. If not, the method 700 branches ahead to block 720. If an information request has been received, the method 700 advances to block 714.

In block 714, the in-vehicle computing system 106 responds to the information request from the parking management computing device 102. In some embodiments, in block 716 the in-vehicle computing system 106 may transmit sensor data from the sensors 170 and/or the location circuitry 172 to the parking management computing device 102. As described above, the parking management computing device 102 may use that sensor data to determine the position of the advanced vehicle 104 and/or any vehicles or other obstructions within the parking zone 114. In some embodiments, in block 718 the in-vehicle computing system 106 may transmit vehicle capabilities information to the parking management computing device 102. As described above, the capabilities information may describe the capabilities of the drive control subsystem 174, including whether the in-vehicle computing system 106 is capable of any autonomous driving, remote control, or other advanced drive capabilities. After responding to the information request, the method 700 loops back to block 710 to monitor for additional requests from the parking management computing device 102.

Referring back to block 712, if an information request was not received, the method 700 branches ahead to block 720. In block 720, the in-vehicle computing system 106 determines whether a movement request has been received from the parking management computing device 102. If not, the method 700 loops back to block 710 to monitor for additional requests from the parking management computing device 102. If a movement request was received, the method 700 advances to block 722.

In block 722, the in-vehicle computing system 106 receives one or more movement instructions from the parking management computing device 102. As described above, the movement instruction may include any discrete movement for the in-vehicle computing systems 106 to cause the advanced vehicle 104 to perform. The movement instruction, in combination with movement instructions sent to other in-vehicle computing systems 106, may arrive at an optimized parking configuration as determined by the parking management computing device 102. In block 724, the in-vehicle computing system 106 accepts the movement instruction. The in-vehicle computing system 106 may accept the movement instruction by sending a confirmation or other indication to the parking management computing device 102 that the movement instruction has been received and will be implemented by the in-vehicle computing system 106.

In block 726, the in-vehicle computing system 106 causes the advanced vehicle 104 to perform the movement instruction(s) using the drive control system 174. The particular movements or other operations controlled by the in-vehicle computing system 106 may depend on the contents of the movement instruction as well as the capabilities of the drive control system 174. As described above, because the in-vehicle computing system 106 may have received the movement request from the parking management computing device 102 while the advanced vehicle 104 is in a soft-off state, the in-vehicle computing system 106 may transition the advanced vehicle 104 to an on state prior to performing the movement instruction (e.g., by starting an engine, energizing a drive system, shifting to an appropriate transmission mode or gear, etc.). After completing the movement instruction, the in-vehicle computing system 106 may return the advanced vehicle 104 to the soft-off state.

In some embodiments, in block 728 the in-vehicle computing system 106 may use autonomous driving capabilities of the drive control system 174 to move the advanced vehicle 104 to a destination specified in the movement instruction(s). For example, the in-vehicle computing system 106 may drive to the destination using any navigation or pathfinding algorithms in combination with sensor data received from the sensors 170 and/or location data received from the location circuitry 172. Additionally or alternatively, the in-vehicle computing system 106 may move as instructed by the movement instruction while using the sensors 170 and/or the location circuitry 172 for confirmation of movement and collision avoidance. As an example, the movement instruction may instruct the in-vehicle computing system 106 to move the advanced vehicle 104 forward a certain distance. The in-vehicle computing system 106 may use a parking assist or similar system to move forward the requested distance while monitoring with the sensors 170 for potential obstructions within the path and, if necessary, stopping the in-vehicle computing system 106. Still additionally or alternatively, the in-vehicle computing system 106 may communicate with the in-vehicle computing systems 106 of nearby advanced vehicles 104 to determine the position of the nearby advanced vehicles 104 and avoid collisions. For example, the in-vehicle computing system 106 may communicate with other in-vehicle computing systems 106 using short-range wireless communications capabilities of the communication circuitry 168 and/or using visible light communication capability of the sensors 170. As the in-vehicle computing system 106 autonomously performs the movement instruction, in some embodiments the in-vehicle computing system 106 may continually transmit sensor data to the parking management computing device 102 and/or otherwise respond to information requests. In other embodiments, the in-vehicle computing system 106 may complete the movement instruction autonomously without further communication to or from the parking management computing device 102.

In some embodiments, in block 730 the in-vehicle computing system 106 may enable remote control by the parking management computing device 102. As described above, the parking management computing device 102 may perform remote autonomous driving for the in-vehicle computing system 106 or may enable remote control by a human operator. After performing the movement instruction, the method 700 loops back to block 710 to continue monitoring for requests from the parking management computing device 102.

EXAMPLES

Illustrative examples of the technologies disclosed herein are provided below. An embodiment of the technologies may include any one or more, and any combination of, the examples described below.

Example 1 includes a parking management computing device to manage vehicle parking, the parking management computing device comprising a secure communications module to establish a secure control connection with a vehicle located in a parking zone; a parking configuration module to (i) receive a parking request from the vehicle via the secure control connection, (ii) query a plurality of parked vehicles positioned in the parking zone for positional data of the parked vehicles, and (iii) determine a parking configuration including the plurality of parked vehicles and the vehicle; and a vehicle movement module to transmit a movement request to a parked vehicle of the parked vehicles, the movement request to implement the parking configuration.

Example 2 includes the subject matter of Example 1, and wherein the parking request comprises a request to park the vehicle; and the vehicle movement module is further to transmit a movement request to the vehicle, the movement request to cause the vehicle to park in the parking zone.

Example 3 includes the subject matter of any of Examples 1 and 2, and wherein the parking request comprises a request to access the vehicle, and wherein the parked vehicles in the parking zone comprises the vehicle.

Example 4 includes the subject matter of any of Examples 1-3, and wherein to receive the parking request comprises to receive a request to access the vehicle from a mobile computing device associated with the vehicle.

Example 5 includes the subject matter of any of Examples 1-4, and wherein the secure control connection comprises a secure wireless connection between the parking management computing device and the vehicle.

Example 6 includes the subject matter of any of Examples 1-5, and wherein to determine the parking configuration comprises to determine a physical position in the parking zone for each of the parked vehicles and the vehicle.

Example 7 includes the subject matter of any of Examples 1-6, and wherein to determine the parking configuration comprises to submit a parking configuration request to a compute service.

Example 8 includes the subject matter of any of Examples 1-7, and wherein to determine the parking configuration comprises to determine a parking configuration as a function of user access requirements associated with the vehicle.

Example 9 includes the subject matter of any of Examples 1-8, and wherein to determine the parking configuration comprises to determine a parking configuration as a function of a user return time associated with the vehicle.

Example 10 includes the subject matter of any of Examples 1-9, and wherein to determine the parking configuration comprises to determine a parking configuration as a function of whether the vehicle is rentable.

Example 11 includes the subject matter of any of Examples 1-10, and wherein to determine the parking configuration comprises to determine a parking configuration that minimizes a number of the parked vehicles required to move.

Example 12 includes the subject matter of any of Examples 1-11, and wherein to determine the parking configuration comprises to determine a parking configuration that minimizes a number of vehicular movements.

Example 13 includes the subject matter of any of Examples 1-12, and wherein to transmit the movement request comprises to transmit destination data to an autonomous driving system of the vehicle, the destination data to enable the autonomous driving system to autonomously drive the vehicle to a destination identified by the destination data.

Example 14 includes the subject matter of any of Examples 1-13, and wherein to transmit the movement request comprises to transmit an instruction to the vehicle to remotely control a movement of the vehicle.

Example 15 includes the subject matter of any of Examples 1-14, and wherein to transmit the movement request comprises to transmit a movement instruction to an operator of the vehicle.

Example 16 includes the subject matter of any of Examples 1-15, and wherein the vehicle movement module is further to track a movement of the vehicle in response to transmission of the movement request, determine whether the movement request is completed based on tracking of the movement of the vehicle; and transmit confirmation information to a user of the vehicle in response to a determination that the movement request is completed.

Example 17 includes the subject matter of any of Examples 1-16, and wherein to transmit the movement request comprises to transmit permissible geographic bounds of the movement request.

Example 18 includes the subject matter of any of Examples 1-17, and wherein the vehicle movement module is further to transmit a second movement request to a second parked vehicle of the parked vehicles, the second movement request to implement the parking configuration.

Example 19 includes an in-vehicle computing system for managed vehicle parking, the in-vehicle computing system comprising a secure communications module to establish a secure control connection with a parking management computing device associated with a parking zone; a request management module to transmit a parking request to the parking management computing device via the secure control connection, the parking request to park the vehicle in the parking zone; and a movement control module to (i) receive a movement request from the parking management computing device in response to transmission of the parking request, the movement request to be based on a parking configuration of a plurality of parked vehicles positioned in the parking zone, and (ii) perform the movement request received from the parking management computing device to park the vehicle.

Example 20 includes the subject matter of Example 19, and wherein the request management module is further to monitor the secure control connection for a second request from the parking management computing device after the vehicle is parked.

Example 21 includes the subject matter of any of Examples 19 and 20, and wherein the request management module is further to receive an information request from the parking management computing device in response to the monitoring of the secure control connection; and transmit a response to the parking management computing device in response to receipt of the information request.

Example 22 includes the subject matter of any of Examples 19-21, and further including a sensor module to receive sensor data from a location sensor of the vehicle or a proximity sensor of the vehicle, wherein to transmit the response comprises to transmit the sensor data.

Example 23 includes the subject matter of any of Examples 19-22, and wherein to transmit the response comprises to transmit capabilities data indicative of autonomous driving capabilities of the vehicle.

Example 24 includes the subject matter of any of Examples 19-23, and wherein the movement control module is further to receive a second movement request from the parking management computing device in response to the monitoring of the secure control connection; and perform the second movement request received from the parking management computing device.

Example 25 includes the subject matter of any of Examples 19-24, and wherein to receive the movement request comprises to receive destination data identifying a destination; and to perform the movement request comprises to autonomously drive the vehicle to the destination identified by the destination data.

Example 26 includes the subject matter of any of Examples 19-25, and wherein to perform the movement request comprises to receive an instruction from the parking management computing device to remotely control a movement of the vehicle.

Example 27 includes the subject matter of any of Examples 19-26, and wherein to receive the movement request comprises to receive permissible geographic bounds of the movement request; and to perform the movement request comprises to restrict a movement of the vehicle to within the permissible geographic bounds.

Example 28 includes the subject matter of any of Examples 19-27, and wherein to establish the secure control connection comprises to establish a secure wireless connection between the vehicle and the parking management computing device.

Example 29 includes a method for managed vehicle parking, the method comprising establishing, by a parking management computing device, a secure control connection with a vehicle located in a parking zone; receiving, by the parking management computing device, a parking request from the vehicle via the secure control connection; querying, by the parking management computing device, a plurality of parked vehicles positioned in the parking zone for positional data of the parked vehicles; determining, by the parking management computing device, a parking configuration including the plurality of parked vehicles and the vehicle; and transmitting, by the parking management computing device, a movement request to a parked vehicle of the parked vehicles, the movement request to implement the parking configuration.

Example 30 includes the subject matter of Example 29, and wherein receiving the parking request comprises receiving a request to park the vehicle; and the method further comprises transmitting, by the parking management computing device, a movement request to the vehicle, the movement request to cause the vehicle to park in the parking zone.

Example 31 includes the subject matter of any of Examples 29 and 30, wherein receiving the parking request comprises receiving a request to access the vehicle, wherein the parked vehicles in the parking zone comprises the vehicle.

Example 32 includes the subject matter of any of Examples 29-31, and wherein receiving the request to access the vehicle comprises receiving a request to access the vehicle from a mobile computing device associated with the vehicle.

Example 33 includes the subject matter of any of Examples 29-32, and wherein establishing the secure control connection comprises establishing a secure wireless connection between the parking management computing device and the vehicle.

Example 34 includes the subject matter of any of Examples 29-33, and wherein determining the parking configuration comprises determining a physical position in the parking zone for each of the parked vehicles and the vehicle.

Example 35 includes the subject matter of any of Examples 29-34, and wherein determining the parking configuration comprises submitting a parking configuration request to a compute service.

Example 36 includes the subject matter of any of Examples 29-35, and wherein determining the parking configuration comprises determining a parking configuration as a function of user access requirements associated with the vehicle.

Example 37 includes the subject matter of any of Examples 29-36, and wherein determining the parking configuration comprises determining a parking configuration as a function of a user return time associated with the vehicle.

Example 38 includes the subject matter of any of Examples 29-37, and wherein determining the parking configuration comprises determining a parking configuration as a function of whether the vehicle is rentable.

Example 39 includes the subject matter of any of Examples 29-38, and wherein determining the parking configuration comprises determining a parking configuration that minimizes a number of the parked vehicles required to move.

Example 40 includes the subject matter of any of Examples 29-39, and wherein determining the parking configuration comprises determining a parking configuration that minimizes a number of vehicular movements.

Example 41 includes the subject matter of any of Examples 29-40, and wherein transmitting the movement request comprises transmitting destination data to an autonomous driving system of the vehicle, the destination data enabling the autonomous driving system to autonomously drive the vehicle to a destination identified by the destination data.

Example 42 includes the subject matter of any of Examples 29-41, and wherein transmitting the movement request comprises transmitting an instruction to the vehicle to remotely control a movement of the vehicle.

Example 43 includes the subject matter of any of Examples 29-42, and wherein transmitting the movement request comprises transmitting a movement instruction to an operator of the vehicle.

Example 44 includes the subject matter of any of Examples 29-43, and further including tracking, by the parking management computing device, a movement of the vehicle in response to transmitting the movement request, determining, by the parking management computing device, whether the movement request is completed based on tracking the movement of the vehicle; and transmitting, by the parking management computing device, confirmation information to a user of the vehicle in response to determining the movement request is completed.

Example 45 includes the subject matter of any of Examples 29-44, and wherein transmitting the movement request comprises transmitting permissible geographic bounds of the movement request.

Example 46 includes the subject matter of any of Examples 29-45, and further including transmitting, by the parking management computing device, a second movement request to a second parked vehicle of the parked vehicles, the second movement request to implement the parking configuration.

Example 47 includes a method for managed vehicle parking, the method comprising establishing, by an in-vehicle computing system, a secure control connection with a parking management computing device associated with a parking zone; transmitting, by the in-vehicle computing system, a parking request to the parking management computing device via the secure control connection, the parking request to park the vehicle in the parking zone; receiving, by the in-vehicle computing system, a movement request from the parking management computing device in response to transmitting the parking request, the movement request being based on a parking configuration of a plurality of parked vehicles positioned in the parking zone; performing, by the in-vehicle computing system, the movement request received from the parking management computing device to park the vehicle.

Example 48 includes the subject matter of Example 47, and further including monitoring, by the in-vehicle computing system, the secure control connection for a second request from the parking management computing device after the vehicle is parked.

Example 49 includes the subject matter of any of Examples 47 and 48, and further including receiving, by the in-vehicle computing system, an information request from the parking management computing device in response to monitoring the secure control connection; and transmitting, by the in-vehicle computing system, a response to the parking management computing device in response to receiving the information request.

Example 50 includes the subject matter of any of Examples 47-49, and wherein transmitting the response comprises transmitting sensor data received from a location sensor of the vehicle or a proximity sensor of the vehicle.

Example 51 includes the subject matter of any of Examples 47-50, and wherein transmitting the response comprises transmitting capabilities data indicative of autonomous driving capabilities of the vehicle.

Example 52 includes the subject matter of any of Examples 47-51, and further including receiving, by the in-vehicle computing system, a second movement request from the parking management computing device in response to monitoring the secure control connection; and performing, by the in-vehicle computing system, the second movement request received from the parking management computing device.

Example 53 includes the subject matter of any of Examples 47-52, and wherein receiving the movement request comprises receiving destination data identifying a destination; and performing the movement request comprises autonomously driving the vehicle to the destination identified by the destination data.

Example 54 includes the subject matter of any of Examples 47-53, and wherein performing the movement request comprises receiving an instruction from the parking management computing device to remotely control a movement of the vehicle.

Example 55 includes the subject matter of any of Examples 47-54, and wherein receiving the movement request comprises receiving permissible geographic bounds of the movement request; and performing the movement request comprises restricting a movement of the vehicle to within the permissible geographic bounds.

Example 56 includes the subject matter of any of Examples 47-55, and wherein establishing the secure control connection comprises establishing a secure wireless connection between the vehicle and the parking management computing device.

Example 57 includes a computing device comprising a processor; and a memory having stored therein a plurality of instructions that when executed by the processor cause the computing device to perform the method of any of claims 29-56.

Example 58 includes one or more machine readable storage media comprising a plurality of instructions stored thereon that in response to being executed result in a computing device performing the method of any of Examples 29-56.

Example 59 includes a computing device comprising means for performing the method of any of Examples 29-56.

Example 60 includes a parking management computing device to manage vehicle parking, the parking management computing device comprising means for establishing a secure control connection with a vehicle located in a parking zone; means for receiving a parking request from the vehicle via the secure control connection; means for querying a plurality of parked vehicles positioned in the parking zone for positional data of the parked vehicles; means for determining a parking configuration including the plurality of parked vehicles and the vehicle; and means for transmitting a movement request to a parked vehicle of the parked vehicles, the movement request to implement the parking configuration.

Example 61 includes the subject matter of Example 60, and wherein the means for receiving the parking request comprises means for receiving a request to park the vehicle; and the parking management computing device further comprises means for transmitting a movement request to the vehicle, the movement request to cause the vehicle to park in the parking zone.

Example 62 includes the subject matter of any of Examples 60 and 61, and wherein the means for receiving the parking request comprises means for receiving a request to access the vehicle, wherein the parked vehicles in the parking zone comprises the vehicle.

Example 63 includes the subject matter of any of Examples 60-62, and wherein the means for receiving the request to access the vehicle comprises means for receiving a request to access the vehicle from a mobile computing device associated with the vehicle.

Example 64 includes the subject matter of any of Examples 60-63, and wherein the means for establishing the secure control connection comprises means for establishing a secure wireless connection between the parking management computing device and the vehicle.

Example 65 includes the subject matter of any of Examples 60-64, and wherein the means for determining the parking configuration comprises means for determining a physical position in the parking zone for each of the parked vehicles and the vehicle.

Example 66 includes the subject matter of any of Examples 60-65, and wherein the means for determining the parking configuration comprises means for submitting a parking configuration request to a compute service.

Example 67 includes the subject matter of any of Examples 60-66, and wherein the means for determining the parking configuration comprises means for determining a parking configuration as a function of user access requirements associated with the vehicle.

Example 68 includes the subject matter of any of Examples 60-67, and wherein the means for determining the parking configuration comprises means for determining a parking configuration as a function of a user return time associated with the vehicle.

Example 69 includes the subject matter of any of Examples 60-68, and wherein the means for determining the parking configuration comprises means for determining a parking configuration as a function of whether the vehicle is rentable.

Example 70 includes the subject matter of any of Examples 60-69, and wherein the means for determining the parking configuration comprises means for determining a parking configuration that minimizes a number of the parked vehicles required to move.

Example 71 includes the subject matter of any of Examples 60-70, and wherein the means for determining the parking configuration comprises means for determining a parking configuration that minimizes a number of vehicular movements.

Example 72 includes the subject matter of any of Examples 60-71, and wherein the means for transmitting the movement request comprises means for transmitting destination data to an autonomous driving system of the vehicle, the destination data enabling the autonomous driving system to autonomously drive the vehicle to a destination identified by the destination data.

Example 73 includes the subject matter of any of Examples 60-72, and wherein the means for transmitting the movement request comprises means for transmitting an instruction to the vehicle to remotely control a movement of the vehicle.

Example 74 includes the subject matter of any of Examples 60-73, and wherein the means for transmitting the movement request comprises means for transmitting a movement instruction to an operator of the vehicle.

Example 75 includes the subject matter of any of Examples 60-74, and further including means for tracking a movement of the vehicle in response to transmitting the movement request, means for determining whether the movement request is completed based on tracking the movement of the vehicle; and means for transmitting confirmation information to a user of the vehicle in response to determining the movement request is completed.

Example 76 includes the subject matter of any of Examples 60-75, and wherein the means for transmitting the movement request comprises means for transmitting permissible geographic bounds of the movement request.

Example 77 includes the subject matter of any of Examples 60-76, and further including means for transmitting a second movement request to a second parked vehicle of the parked vehicles, the second movement request to implement the parking configuration.

Example 78 includes an in-vehicle computing system for managed vehicle parking, the in-vehicle computing system comprising means for establishing a secure control connection with a parking management computing device associated with a parking zone; means for transmitting a parking request to the parking management computing device via the secure control connection, the parking request to park the vehicle in the parking zone; means for receiving a movement request from the parking management computing device in response to transmitting the parking request, the movement request being based on a parking configuration of a plurality of parked vehicles positioned in the parking zone; means for performing the movement request received from the parking management computing device to park the vehicle.

Example 79 includes the subject matter of Example 78, and further including means for monitoring the secure control connection for a second request from the parking management computing device after the vehicle is parked.

Example 80 includes the subject matter of any of Examples 78 and 79, and further including means for receiving an information request from the parking management computing device in response to monitoring the secure control connection; and means for transmitting a response to the parking management computing device in response to receiving the information request.

Example 81 includes the subject matter of any of Examples 78-80, and wherein the means for transmitting the response comprises means for transmitting sensor data received from a location sensor of the vehicle or a proximity sensor of the vehicle.

Example 82 includes the subject matter of any of Examples 78-81, and wherein the means for transmitting the response comprises means for transmitting capabilities data indicative of autonomous driving capabilities of the vehicle.

Example 83 includes the subject matter of any of Examples 78-82, and further including means for receiving a second movement request from the parking management computing device in response to monitoring the secure control connection; and means for performing the second movement request received from the parking management computing device.

Example 84 includes the subject matter of any of Examples 78-83, and wherein the means for receiving the movement request comprises means for receiving destination data identifying a destination; and the means for performing the movement request comprises means for autonomously driving the vehicle to the destination identified by the destination data.

Example 85 includes the subject matter of any of Examples 78-84, and wherein the means for performing the movement request comprises means for receiving an instruction from the parking management computing device to remotely control a movement of the vehicle.

Example 86 includes the subject matter of any of Examples 78-85, and wherein the means for receiving the movement request comprises means for receiving permissible geographic bounds of the movement request; and the means for performing the movement request comprises means for restricting a movement of the vehicle to within the permissible geographic bounds.

Example 87 includes the subject matter of any of Examples 78-86, and wherein the means for establishing the secure control connection comprises means for establishing a secure wireless connection between the vehicle and the parking management computing device.

The invention claimed is:

1. A parking management computing device to manage vehicle parking, the parking management computing device comprising:
   a secure communications module to establish a secure control connection with a vehicle located in a parking zone;
   a parking configuration module to (i) receive a parking request from the vehicle via the secure control connection, (ii) query a plurality of parked vehicles positioned in the parking zone for positional data of the parked vehicles, and (iii) determine a parking configuration including the plurality of parked vehicles and the vehicle; and
   a vehicle movement module to transmit a movement request to a parked vehicle of the parked vehicles, wherein the movement request includes at least one instruction to move the parked vehicle to implement the parking configuration.

2. The parking management computing device of claim 1, wherein:
   the parking request comprises a request to park the vehicle; and
   the vehicle movement module is further to transmit a movement request to the vehicle, the movement request to cause the vehicle to park in the parking zone.

3. The parking management computing device of claim 1, wherein the parking request comprises a request to access the vehicle, and wherein the parked vehicles in the parking zone comprises the vehicle.

4. The parking management computing device of claim 3, wherein to receive the parking request comprises to receive a request to access the vehicle from a mobile computing device associated with the vehicle.

5. The parking management computing device of claim 1, wherein to determine the parking configuration comprises to determine a physical position in the parking zone for each of the parked vehicles and the vehicle.

6. The parking management computing device of claim 1, wherein to determine the parking configuration comprises to submit a parking configuration request to a compute service.

7. The parking management computing device of claim 1, wherein to determine the parking configuration comprises to determine a parking configuration as a function of user access requirements associated with the vehicle.

8. The parking management computing device of claim 1, wherein to transmit the movement request comprises to transmit destination data to an autonomous driving system of the vehicle, the destination data to enable the autonomous driving system to autonomously drive the vehicle to a destination identified by the destination data.

9. The parking management computing device of claim 1, wherein the vehicle movement module is further to transmit a query to the vehicle to determine an autonomous movement capability of the vehicle.

10. The parking management computing device of claim 1, wherein the vehicle movement module is further to:
    track a movement of the vehicle in response to transmission of the movement request,
    determine whether the movement request is completed based on tracking of the movement of the vehicle; and
    transmit confirmation information to a user of the vehicle in response to a determination that the movement request is completed.

11. An in-vehicle computing system for managed vehicle parking, the in-vehicle computing system comprising:

a secure communications module to establish a secure control connection with a parking management computing device associated with a parking zone;

a request management module to transmit a parking request to the parking management computing device via the secure control connection, the parking request to park the vehicle in the parking zone; and a movement control module to (i) receive a movement request from the parking management computing device in response to transmission of the parking request, the movement request to be based on a parking configuration of a plurality of parked vehicles positioned in the parking zone, and (ii) perform the movement request received from the parking management computing device to park the vehicle;

wherein the request management module is further to monitor the secure control connection for a second request from the parking management computing device after the vehicle is parked.

12. The in-vehicle computing system of claim 11, further comprising a sensor module to receive sensor data from a location sensor of the vehicle or a proximity sensor of the vehicle, wherein the request management module is further to:

receive an information request from the parking management computing device in response to the monitoring of the secure control connection; and transmit a response to the parking management computing device in response to receipt of the information request, wherein to transmit the response comprises to transmit the sensor data.

13. The in-vehicle computing system of claim 11, wherein the movement control module is further to:

receive a second movement request from the parking management computing device in response to the monitoring of the secure control connection; and perform the second movement request received from the parking management computing device.

14. The in-vehicle computing system of claim 11, wherein:

to receive the movement request comprises to receive permissible geographic bounds of the movement request; and to perform the movement request comprises to restrict a movement of the vehicle to within the permissible geographic bounds.

15. One or more computer-readable storage media comprising a plurality of instructions that in response to being executed cause a parking management computing device to:

establish a secure control connection with a vehicle located in a parking zone;

receive a parking request from the vehicle via the secure control connection;

query a plurality of parked vehicles positioned in the parking zone for positional data of the parked vehicles;

determine a parking configuration including the plurality of parked vehicles and the vehicle; and transmit a movement request to a parked vehicle of the parked vehicles, wherein the movement request includes at least one instruction to move the parked vehicle to implement the parking configuration.

16. The one or more computer-readable storage media of claim 15, wherein:

to receive the parking request comprises to receive a request to park the vehicle; and the one or more computer-readable storage media further comprises a plurality of instructions that in response to being executed cause the parking management computing device to transmit a movement request to the vehicle, the movement request to cause the vehicle to park in the parking zone.

17. The one or more computer-readable storage media of claim 15, wherein to receive the parking request comprises to receive a request to access the vehicle, wherein the parked vehicles in the parking zone comprises the vehicle.

18. The one or more computer-readable storage media of claim 15, wherein to transmit the movement request comprises to transmit destination data to an autonomous driving system of the vehicle, the destination data to enable the autonomous driving system to autonomously drive the vehicle to a destination identified by the destination data.

19. The one or more computer-readable storage media of claim 15, wherein to transmit the movement request comprises to transmit an instruction to the vehicle to remotely control a movement of the vehicle.

20. The one or more computer-readable storage media of claim 15, further comprising a plurality of instructions that in response to being executed cause the parking management computing device to:

track a movement of the vehicle in response to transmitting the movement request, determine whether the movement request is completed based on tracking the movement of the vehicle; and transmit confirmation information to a user of the vehicle in response to determining the movement request is completed.

21. One or more computer-readable storage media comprising a plurality of instructions that in response to being executed cause an in-vehicle computing system to:

establish a secure control connection with a parking management computing device associated with a parking zone;

transmit a parking request to the parking management computing device via the secure control connection, the parking request to park the vehicle in the parking zone;

receive a movement request from the parking management computing device in response to transmitting the parking request, the movement request being based on a parking configuration of a plurality of parked vehicles positioned in the parking zone;

perform the movement request received from the parking management computing device to park the vehicle; and monitor the secure control connection for a second request from the parking management computing device after the vehicle is parked.

22. The one or more computer-readable storage media of claim 21, further comprising a plurality of instructions that in response to being executed cause the in-vehicle computing system to:

receive a second movement request from the parking management computing device in response to monitoring the secure control connection; and perform the second movement request received from the parking management computing device.

23. The one or more computer-readable storage media of claim 21, wherein:

to receive the movement request comprises to receive permissible geographic bounds of the movement request; and to perform the movement request comprises to restrict a movement of the vehicle to within the permissible geographic bounds.

24. The in-vehicle computing system of claim 11, wherein the movement control module is further to enable remote control of the vehicle.

25. The one or more computer-readable storage media of claim 21, further comprising a plurality of instructions that in response to being executed cause the in-vehicle computing system to transmit a location of at least one obstacle to the parking management computing device.

* * * * *